United States Patent [19]

Kalinichenko

[11] 4,204,267

[45] May 20, 1980

[54] DIGITAL CONTROL DEVICE FOR D.C. THYRISTOR-PULSE CONVERTER

[75] Inventor: Anatoly Y. Kalinichenko, Moscow, U.S.S.R.

[73] Assignee: Vsesojuzny Nauchno-Issledovatelsky Institut Vagonostroenia, Moscow, U.S.S.R.

[21] Appl. No.: 895,276

[22] Filed: Apr. 10, 1978

[51] Int. Cl.$^2$ ............................................. H02P 13/24
[52] U.S. Cl. ........................................ 363/85; 363/96; 363/135
[58] Field of Search .................. 307/252 M, 269, 271, 307/233 A; 323/25; 363/78–79, 84–88, 95–96, 135–136, 128

[56] References Cited

U.S. PATENT DOCUMENTS

| | | | |
|---|---|---|---|
| 3,491,283 | 1/1970 | Johnston | 363/85 |
| 3,562,625 | 2/1971 | Brock et al. | 363/87 |
| 3,582,757 | 6/1971 | Achinger et al. | 363/135 |
| 3,764,890 | 10/1973 | Caen | 363/25 X |
| 3,919,622 | 11/1975 | Alnema et al. | 363/135 |
| 3,986,099 | 10/1976 | Beck et al. | 363/135 |
| 4,019,116 | 4/1977 | Klantschek | 363/138 |
| 4,063,146 | 12/1977 | Oliver | 363/87 X |

*Primary Examiner*—J. D. Miller
*Assistant Examiner*—Peter S. Wong
*Attorney, Agent, or Firm*—Lackenbach, Lilling & Siegel

[57] ABSTRACT

The proposed digital control device controls a d.c. thyristor-pulse converter and comprises a decoder connected to a clock pulse counter and a reversible counter. The device further includes a control unit, a matching unit containing four AND gates and a sign flip-flop, and a switching unit having six AND gates and two flip-flops. A first AND gate of the switching unit is connected to a control electrode of a first thyristor, a second AND gate of the switching unit is connected to a control electrode of a second thyristor, a third AND gate is connected to a control electrode of a third thyristor, a fourth AND gate is connected to control electrode of a fourth thyristor, a fifth AND gate is connected to the control electrodes of the first and third thyristors, and a sixth AND gate is connected to the control electrodes of the second and fourth thyristors. The clock pulse counter and the AND gates are connected to the flip-flops of the switching unit. In the matching unit, the first and second AND gates are connected to a position selection output of the control unit and the third and fourth AND gates are connected to a position return output of the control unit. Outputs of the second and fourth AND gates are connected to an add input of the reversible counter and the subtract input is connected to outputs of the first and third AND gates of the matching unit. The reversible counter is connected to the decoder, which is connected to the sign flip-flop. A second input of the sign flip-flop is connected to the decoder and to a reset output of the control unit. The sign flip-flop is connected to the second and third AND gates of the matching unit and the first, second, third and fourth AND gates of the switching unit. Another output of the sign flip-flop is connected to the first and fourth AND gates of the matching unit and the fifth and sixth AND gates of the switching unit.

1 Claim, 7 Drawing Figures

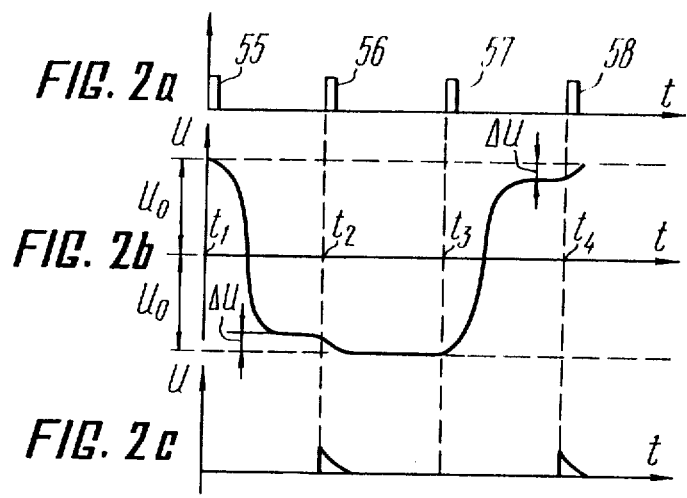
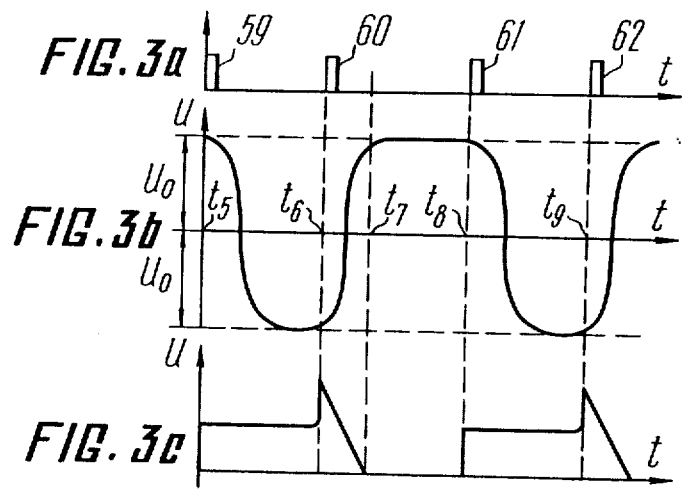

DIGITAL CONTROL DEVICE FOR D.C. THYRISTOR-PULSE CONVERTER

FIELD OF THE INVENTION

The present invention relates to means for controlling static converters built of gas-discharge, electronic or semiconductor devices incorporating a control electrode and, more particularly, it is related to digital control device for controlling a thyristor-pulse d.c. converter. The device of the present invention can be used to control the speed of rotation of d.c. machines employed in industry and railroad transport; it can also be used to control voltage across an inductive-active load.

DESCRIPTION OF THE PRIOR ART

There is known a digital control device intended to control a thyristor-pulse d.c. converter (cf. USSR Inventor's Certificate No. 394,907, Cl. HO2p 13/16), comprising a decoder whose first information inputs are connected to information outputs of a clock pulse counter arranged at an output of a master oscillator and having two separate time-fixed control pulse outputs. Second information inputs of the decoder are connected to information outputs of a reversible counter. The two time-shiftable control pulse outputs of the decoder are electrically coupled via a control pulse switching unit, built of AND gates, to electrodes of control thyristors of the converter. Outputs of control pulses for switching control states of the decoder are connected to inputs of a unit for matching the states of the control pulse switching unit and the reversible counter with those of a control unit. Other inputs of the matching unit, which include a sign flip-flop, are connected to position selection and return outputs of the control unit, as well as to a reset output of the control unit, which is also connected to reset inputs of the reversible counter and of the master oscillator. First outputs of the matching unit are connected to add and subtract inputs of the reversible counter, and second outputs of the matching unit are connected to inputs of the switching unit.

Depending upon the state of the sign flip-flop of the matching unit, the two time-shiftable control pulse outputs of the decoder are either connected via the switching unit, comprising four AND gates, to the control electrodes of a first pair of thyristors of the converter (this applies to the initial stage of control), or, as control is underway, to the control electrodes of the second pair of thyristors of the converter.

During all the control stages, the separate time-fixed control pulse outputs of the clock pulse counter are permanently connected to the control electrodes of a third pair of thyristors of the converter, which operate in antiphase.

This does not make it possible to connect the time-shiftable control pulse outputs of the decoder to the control electrodes of the thyristors, which are permanently connected to the outputs of the clock pulse counter; nor does it make possible to connect these to the control electrodes of the converter's thyristors, to which from the outputs of the decoder there are applied time-shiftable pulses; and, nor does it make possible to change the order in which control pulses arrive at the control electrodes of all the thyristors of the converter.

As a result, it is impossible to digitally control a thyristor-pulse converter with a common commutation unit and with precharging of a switching capacitor without the main thyristors, although such a converter provides for controlling the rotation speed of d.c. machines employed in industry and railroad transport over a wide range and incorporates switching means of a minimized weight and size.

SUMMARY OF THE INVENTION

It is an object of the present invention to provide a digital control device for controlling a d.c. thyristor-pulse converter, which would make it possible to control a converter with a common commutation unit and with precharging of the switching capacitor without the main thyristors.

The foregoing object is attained by providing a digital control device intended to control a d.c. thyristor-pulse converter, comprising a decoder whose first information inputs are connected to information outputs of a clock pulse counter which is arranged at an output of a master oscillator and has two separate time-fixed control pulse outputs. Second information inputs of the decoder are connected to information outputs of a reversible counter. Two time-shiftable control pulse outputs of the decoder are electrically coupled via a control pulse switching unit, built of AND gates, to electrodes of controlled thyristors of the converter. Outputs of control pulses for switching control stages of the decoder are connected to inputs of a unit for matching the states of the control pulse switching unit and of the reversible counter with those of a control unit. Other inputs of said matching unit, which includes a sign flip-flop, are connected to position selection and return outputs of the control unit and to a reset output of said control unit, which is also connected to reset inputs of the reversible counter and of the master oscillator. First outputs of the matching unit are connected to add and subtract inputs of the reversible counter, and second outputs of said matching unit are connected to inputs of the switching unit. The matching unit additionally includes four AND gates and the control pulse switching unit includes six AND gates and two flip-flops with counting inputs. An output of the first AND gate of the switching unit is connected to a control electrode of a first thyristor, which is also connected to a first output of the clock pulse counter, which is also connected to an input of the first flip-flop; an output of the second AND gate is connected to a control electrode of a second thyristor, which is also connected to a second output of the clock pulse counter, which is also connected to an input of the second flip-flop; an output of the third AND gate is connected to a control electrode of a third thyristor, and a first input of said third AND gate is connected to an output of the second flip-flop; an output of the fourth AND gate is connected to a control electrode of a fourth thyristor, and a first input of said fourth AND gate is connected to an output of the first flip-flop an output of the fifth AND gate is connected to the control electrodes of the first and third thyristors, and a first input of said fifth AND gate is connected to the first control pulse output of the decoder, which is also connected to a first input of the second AND gate; and an output of the sixth AND gate is connected to the control electrodes of the second and fourth thyristors, and a first input of said sixth AND gate is connected to the second control pulse output of the decoder, which is also connected to a first input of the first AND gate. First inputs of the first and second AND gates of the matching unit are connected to the position selection output of the control unit, first inputs of the third and fourth AND gates of the matching unit are connected to the position return output of the control unit, outputs of the second and fourth AND gates of the matching unit are connected to the add input of the reversible counter, and outputs of the first and third AND gates of the matching unit are connected to the subtract input of the reversible counter. The reset input of said reversible counter is connected to one of the outputs of control pulses for switching control stages of the decoder, which is also connected to a first input of the sign flip-flop. A second input of said sign flip-flop is connected to the second output of control pulses for switching control stages of the decoder and to the reset output of the control unit. A first output of the sign flip-flop is connected to second inputs of the second and third AND gates of the matching unit and of the first second, third and fourth AND gates of the switching unit. A second output of the sign flip-flop is connected to second inputs of the first and fourth AND gates of the matching unit and of the fifth and sixth AND gates of the switching unit.

BRIEF DESCRIPTION OF THE DRAWINGS

A better understanding of the present invention will be had from a consideration of the following detailed description of a preferred embodiment thereof, taken in conjunction with the accompanying drawings, wherein:

FIGS. 2a, 2b, and 2c are graphs showing voltages across different elements of the controlled converter versus time during the first control stage, in accordance with the invention; and FIGS. 3a, 3b and 3c are graphs showing voltages across the same elements of the controlled converter versus time during the second control stage, in accordance with the invention.

DETAILED DESCRIPTION OF THE INVENTION

Figure 1:
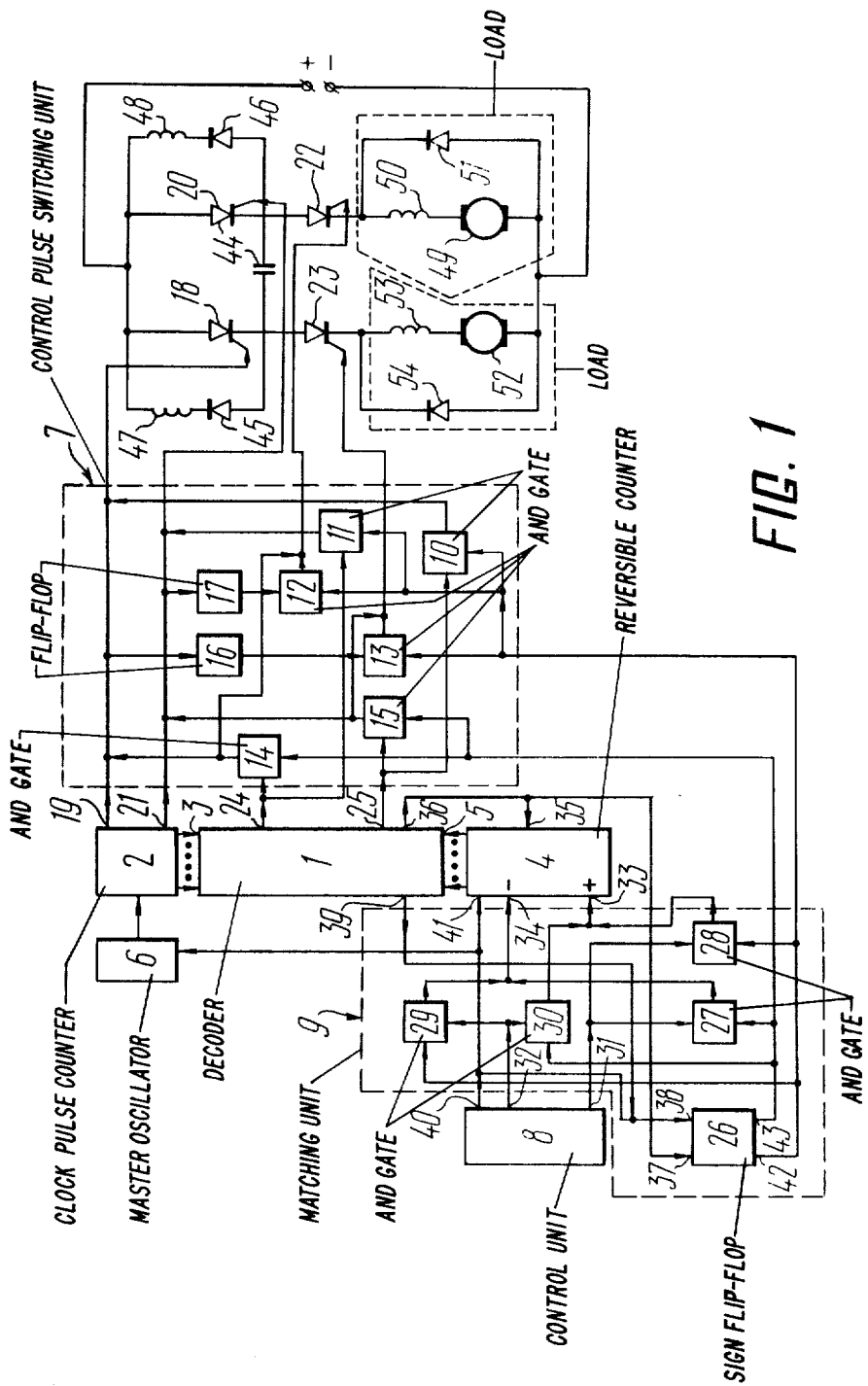
FIG. 1 is a block diagram of a digital control device for controlling a d.c. thyristor-pulse converter with a controlled converter, in accordance with the invention.

Referring to the attached drawings, the proposed digital control device for controlling a d.c. thyristor-pulse converter comprises a decoder 1 (FIG. 1), a clock pulse counter 2 whose information outputs are connected to first information inputs 3 of the decoder 1, a reversible counter 4 whose information outputs are connected to second information inputs 5 of the decoder 1, and a master oscillator 6 whose output is connected to an input of a clock pulse counter 2.

The device further includes a control pulse switching unit 7, a control unit 8 and a matching unit 9 for matching the states of the control pulse switching unit 7 and of the reversible counter 4 with those of the control unit 8.

The control pulse switching unit 7 comprises AND gates 10, 11, 12, 13, 14 and 15, and flip-flops 16 and 17 with counting inputs.

An output of the AND gate 10 is connected to a control electrode of a first controlled thyristor 18, which is also connected to a first output 19 of the clock pulse counter 2, which is also connected to the counting input of the first flip-flop 16.

An output of the AND gate 11 is connected to a control electrode of a second controlled thyristor 20 of the converter, which is also connected to a second output 21 of the clock pulse counter 2, which is also connected to the counting input of the second flip-flop 17.

An output of the AND gate 12 is connected to a control electrode of a third controlled thyristor 22 of the converter; and, a first input of the AND gate 12 is connected to an output of the second flip-flop 17.

An output of the AND gate 13 is connected to a control electrode of a fourth controlled thyristor 23 of the converter; and, a first input of the AND gate 13 is connected to an output of the first flip-flop 16.

An output of the AND gate 14 is connected to the control electrodes of the first thyristor 18 and the third thyristor 22 of the converter; and, a first input of the AND gate 14 is connected to a first control pulse output 24 of the decoder 1, which is also connected to a first input of the AND gate 11.

An output of the AND gate 15 is connected to the control electrodes of the second thyristor 20 and the fourth thyristor 23 of the converter; and, a first input of the AND gate is connected to a second control pulse output 25 of the decoder 1, which is also connected to a first input of the AND gate 10.

The matching unit 9 for matching the states of the control pulse switching unit 7 and of the reversible counter 4 with those of the control unit 8 comprises a sign flip-flop 16 and AND gates 27, 28, 29 and 30.

First inputs of the AND gates 27 and 28 are connected to a position selection output 31 of the control unit 8. First inputs of the AND gate 29 and 30 are connected to a position return output 32 of the control unit 8.

Outputs of the AND gates 28 and 30 are connected to an add input 33 of the reversible counter 4 and the subtract input 34 is connected to outputs of the AND gates 27 and 29. A reset input 35 of the reversible counter 4 is connected to a first switching output 36 of control pulses for switching control stages of the decoder 1, which is also connected to a first input 37 of the sign flip-flop 26.

A second input 38 of the sign flip-flop 26 is connected to a second switching output 39 of control pulses for switching control stages of the decoder 1 and to a reset output 40 of the control unit 8.

The reset output 40 of the control unit 8 is connected to a reset input 41 of the reversible counter 4 and to a reset input of the master oscillator 6.

A first output 42 of the sign flip-flop is connected to second inputs of the AND gates 10, 11, 12, 13, 28 and 29. A second separate output 43 of the sign flip-flop 26 is connected to second inputs of the AND gates 14, 15, 27 and 30.

Apart from the controlled thyristors 18, 20, 22 and 23, the thyristor-pulse converter includes a switching capacitor 44 connected in the diagonal of the bridge formed by the aforesaid controlled thyristors 18, 20, 22 and 23. The thyristors 18 and 20 are shunted by switching circuits comprising diodes 45 and 46 and reactors 47 and 48.

Placed in the circuit of the thyristor 22 is a load composed of an armature 49 and an exciting winding 50 which are connected in series and shunted by a diode 51.

Placed in the circuit of the thyristor 22 is a load composed of an armature 52 and an exciting winding 53 which are connected in series and shunted by a diode 54.

FIG. 2 shows graphs of the first control stage:

Plot 2a shows voltage pulses 55, 56, 57 and 58 across the control electrodes of the thyristors 18, 20, 22 and 23 respectively versus time t;

Plot 2b shows voltages U across the switching capacitor 44 versus time t; and

Plot 2c shows voltages U across the load versus time t.

FIG. 3 shows graphs of the second control stage:

Plot 3c shows voltage pulses 59, 60, 61 and 62 across the control electrodes of the thyristors 18, 20, 22 and 23 respectively versus time t;

Plot 3b shows voltages U across the switching capacitor 44 versus time t; and

Plot 3c shows voltages U across the load versus time t.

The proposed digital control device for controlling a d.c. thyristor-pulse converter operates as follows.

At the initial moment of operation, from the output 40 (FIG. 1) of the control unit 8 to the input 41 of the reversible counter 4 and to the input of the master oscillator 6 there is applied a signal which sets the reversible counter 4 and the master oscillator 6 in their respective initial states. Simultaneously, this signal is applied to the input 38 of the sign flip-flop 26, whereby the flip-flop is brought to a steady state at which there is a signal at the output 43 of the sign flip-flop 26.

To the input of the clock pulse counter 2 from the output of the master oscillator 6 there is continuously applied clock pulses which arrive at a frequency selected depending upon the operating frequency of the thyristors 18, 20, 22 and 23 of the controlled converter, as well as upon the digit capacity of the counters 2 and 4.

These clock pulses change the state of the flip-flops of the clock pulse counter 2 so that from its outputs 19 and 21 to the control electrodes of the thyristors 18 and 20 there are applied time-fixed pulses whose frequency is equal to the operating frequency of the thyristors 18, 20, 22 and 23 of the controlled converter. During the first half period of the time-fixed control pulses there is a pulse at the output 19 of the counter 2; during the second half period there is a pulse at the output 21 of the counter 2.

Thus at the moment of time $t_1$ (FIG. 2a) to the control electrode of the first controlled thyristor 18 (FIG. 1) there is applied the pulse 55 which drives the thyristor 18 (FIG. 1) into conduction. As this takes place, the switching capacitor 44 is recharged to the opposite polarity, which is done through the circuit composed of the capacitor 44, the switching diode 46, the switching reactor 48, and the thyristor 18.

The thyristor 22 of the bridge is not conducting current, so no voltage is applied to the armature 49 and the exciting winding 50. After the capacitor 44 is recharged to the opposite polarity, the value of voltage across it is lower than the initial voltage $U_o$ (FIG. 2b) by $\Delta U$, which is due to the active resistance losses in the recharging circuit.

During the first stage of control, a minimum voltage is applied to the load within the first half period; the time interval between the switching on of the thyristor 18 (FIG. 1) and the simultaneous switching on of the thyristors 18 and 22 is at its maximum, which is due to a maximum shift in time of the pulses arriving from the output 19 of the clock pulse counter 2 and the output 25 of the decoder 1.

During the second half period, the aforesaid minimum voltage is applied to the load with a maximum interval between the switching on of the thyristor 20 and the simultaneous switching on of the thyristors 20 and 23, which is due to a maximum shift in time between the pulses coming from the output 21 of the clock pulse counter 2 and the output 24 of the decoder 1.

As a signal is applied from the output 31 of the control unit 8 to the input of the AND gate 27, to whose second input there is applied a signal from the output 43 of the sign flip-flop 26, the AND gate 27 is driven into conduction so that to the subtract input 34 of the reversible counter 4 there is passed a signal which changes the state of the flip-flops of the reversible counter 4.

If the states of the counters 2 and 4 coincide, pulses start coming from the outputs 24 and 25 of the decoder 1. These pulses are displaced by 180° relative to each other and shifted in time with respect to the pulses coming from the outputs 19 and 21 of the clock pulse counter 2 by a value which is inversely proportional to the product of the discreteness of quantization of the switching period of the thyristors 18, 20, 22 and 23 by the number of pulses applied to the subtract input 34 of the reversible counter 4.

From the output 24 of the decoder 1, a pulse is applied to the input of the AND gate 14 to whose other input there is applied a signal from the output 43 of the sign flip-flop 26. The AND gate 14 is driven into conduction and at the moment of time $t_2$ (FIG. 2a) it simultaneously sends the pulse 56 to the control electrodes of the thyristors 18 and 22 (FIG. 1).

As the thyristors 18 and 22 are simultaneously driven into conduction, the switching capacitor 44 is charged to reach the initial voltage level, which is done through a circuit composed of the armature 49, the exciting winding 50 and a power source. At this instant, the voltage applied to the load is equal to $\Delta U$ (FIG. 2b).

Upon the end of the first half period of the time-fixed pulses, at the moment of time $t_3$ (FIG. 2a), the pulse 57 (FIG. 2a) is applied from the output 21 (FIG. 1) of the clock pulse counter 2 to the control electrode of the thyristor 20; at the instant $t_3$ the pulse 57 drives the thyristor 20 (FIG. 1) into conduction.

As this takes place, the capacitor 44 is recharged to the opposite polarity through the circuit composed of the capacitor 44, the switching diode 45, the switching reactor 47 and the thyristor 20. After the capacitor 44 is recharged to the opposite polarity, the voltage across it is lower than the initial voltage $U_o$ (FIG. 2b) by $\Delta U$, which value corresponds to the active resistance losses of the recharging circuit.

After the first half of the repetition period of the time-shiftable control pulses, the next pulse produced at the output 25 (FIG. 1) of the decoder 1 is applied to the input of the AND gate 15, to whose other input there is applied a signal from the output 43 of the sign flip-flop 26.

At the instant $t_4$ (FIG. 2a), the AND gate 15 is driven into conduction so that the pulse 58 is simultaneously passed to the control electrodes of the thyristors 20 and 23 (FIG. 1).

As this takes place, the switching capacitor 44 is recharged to the initial voltage level, which is done through the circuit composed of the armature 52, the exciting winding 53 and the power source.

During the interval between the pulses, the current through the load is maintained with the aid of the inverse diodes 51 and 54.

As signals continue to arrive from the output 31 of the control unit 8 to the subtract input 34 of the reversible counter 4, the counter's state is reversed. When the states of the clock pulse counter 2 and the reversible counter 4 coincide, there is a reduction in the time difference between the pulses arriving from the outputs 19 and 21 of the counter 2 and the pulses arriving from the outputs 24 and 25 of the decoder 1. The reduction in this interval corresponds to the increase in the voltage applied to the load.

With a minimum interval equal to the discreteness of quantization of the switching period of the thyristors 18, 20, 22 and 23, which is dependent upon the digit capacity of the counters 2 and 4, a signal is produced at the output 36 of the decoder 1.

This signal is applied to the input 37 of the sign flip-flop 26, whereby the flip-flop is brought to another steady state determined by the presence of a signal at the output 42 and the absence of a signal at the output 43.

Simultaneously, a signal is applied from the output 36 of the decoder 1 to the input 35 of the reversible counter 4, whereby the counter is brought back to its initial state for the second stage of control.

Control signals continue to arrive from the output 31 of the control unit 8 and are applied via the AND gate 28, to whose second input there is applied a signal from the output 42 of the sign flip-flop 26, to the add input 33 of the reversible counter 4 which starts adding.

From the output 42 of the sign flip-flop 26, the signal is also applied to the inputs of the AND gates 10, 11, 12 and 13.

During the second stage of control, a pulse from the output 19 of the clock pulse counter 2 is applied to the input of the flip-flop 16; the first pulse arriving at the input of the flip-flop 16 makes the flip-flop ready to produce a signal; the next pulse arriving at the input of the flip-flop 16 produces an output signal; and the next input pulse brings the flip-flop 16 to a state at which there is no signal at its output, etc.

Thus every other pulse applied to the input of the flip-flop 16 actuates it. The flip-flop 17 operates as the flip-flop 1.

The signal produced at the output of the flip-flop 16 is applied to the control electrode of the thyristor 23 via the AND gate 13 at whose other input there is a signal applied from the output 42 of the sign flip-flop 26.

At the moment of time $t_5$ (FIG. 3a), the pulse 59 is simultaneously applied to the control electrodes of the thyristors 18 and 23 (FIG. 1).

The thyristors 18 and 23 are driven into conduction, and the power source's voltage (FIG. 3c) is applied to the load through the circuit composed of the winding 53 and the armature 52. At this moment (FIG. 3b), the capacitor 44 (FIG. 1) starts recharging.

During the second stage of control, the first half period is marked by an increase in the time shift between the pulses applied to the thyristors 18 and 23 and the pulses applied to the thyristor 20. During the second half period of the second stage of control, there is an increase in the time difference between the pulses applied to the thyristors 20 and 22 and the pulses applied to the thyristor 18.

When the states of the flip-flops of the clock pulse counter 2 and those of the flip-flops of the reversible counter 4 coincide, at the output 24 of the decoder 1 there is produced a pulse which is applied via the AND gate 11 to the control electrode of the thyristor 20, to the second input of the AND gate 11 there being applied a signal from the output 42 of the sign flip-flop 26. Simultaneously, the same pulse is applied from the output of the AND gate 11 to the counting input of the flip-flop 17, whereby the flip-flop 17 is brought to a state at which there is no signal at the output of this flip-flop 17; this means that the flip-flop 17 is ready to produce a signal at its output upon the arrival of a pulse at its input.

At the moment of time $t_6$ (FIG. 3a), the pulse 60 drives the thyristor 20 (FIG. 1) into conduction, and to the thyristor 18 there is applied the inverse voltage of the capacitor 44 whose recharging is over (FIG. 3b); the total voltage of the power source and the capacitor 44 is applied to the load composed of the exciting winding 53 (FIG. 1) and the armature 52.

When the recharging of the capacitor 44 through the diode 45 and the reactor 47 is over (FIG. 3b), voltage is no longer applied to the load (this takes place at the moment of time $t_7$).

Upon the end of the first half period of the time-fixed control pulses, another pulse is produced at the output 21 (FIG. 1) of the clock pulse counter 2, which pulse is simultaneously applied to the control electrode of the thyristor 20 and to the counting input of the flip-flop 17 which is ready to produce a signal at its output.

Upon the arrival of the pulse at the input of the flip-flop 17, the signal is applied from the flip-flop's output to the control electrode of the thyristor 22, which is done via the AND gate 12 to whose other input there is applied a signal from the separate output 42 of the sign flip-flop 26.

Thus at the moment of time $t_8$ (FIG. 3a), the pulse 61 simultaneously drives the thyristors 20 and 22 (FIG. 1) into conduction; as this takes place, the voltage of the power source is applied to the load composed of the winding 50 and the armature 49 (FIG. 3c); the capacitor 44 (FIG. 1) starts recharging (FIG. 3b) to the opposite polarity through the diode 45 and the reactor 47.

Upon the end of the first half period of repetition of the time-shiftable control pulses and in case of a coincidence of the states of the flip-flops of the clock pulse counter 2 and those of the flip-flops of the reversible counter 4, the next pulse is produced at the output 25 of the decoder 1.

This pulse is applied to the control electrode of the thyristor 18 via the AND gate 10 to whose other input there is applied a signal from the output 42 of the sign flip-flop 26.

Simultaneously, this pulse is applied to the counting input of the flip-flop 16, whereby the latter is brought to a state at which there is no signal at its output; this means that the flip-flop 16 is prepared to produce a signal at its output upon the arrival of the next pulse at its input.

At the moment of time $t_9$ (FIG. 3a), the pulse 62 drives the thyristor 18 (FIG. 1) into conduction; to the thyristor 20 there is applied the inverse voltage of the capactior 44 whose recharging is over (FIG. 3b); the total voltage of the power source and the capacitor 44 is applied to the load composed of the winding 53 (FIG. 1) and the armature 52.

As signals continue to arrive from the output 31 of the control unit 8 to the add input 33 of the reversible counter 4, the counter's state is changed; a coincidence of the states of the clock pulse counter 2 and the reversible counter 4 increases the shift in time between the pulses arriving from the outputs 19 and 21 of the counter 2 and the pulses arriving from the outputs 24 and 25 of the decoder 1. The increase in this interval corresponds to the increase in the voltage applied to the load.

When the last stage of control is reached, the position is fixed.

In order to effect a position return, a position return signal is applied from the output 32 of the control unit 8 to the input of the AND gate 29, to whose other input there is applied a signal from the output 42 of the sign flip-flop 26. From the output of the AND gate 29, the signal is applied to the subtract input 34 of the reversible counter 4, whereby the counter's flip-flops are brought to a respective state. If the states of the flip-flops of the counter 4 coincide with those of the flip-flops of the clock pulse counter 2, there is a reduction in the time shift between the pulses arriving from the output 19 of the counter 2 and the pulses applied to the control electrode of the thyristor 22, as well as a decrease in the interval between the pulses applied to the control electrode of the thyristor 20 and the pulses applied to the control electrode of the thyristor 23.

Each next signal arriving from the output 32 of the control unit 8 decreases the duration of the output voltage pulse by the quantization discreteness value.

Upon the end of the second control stage, at which voltage across the load is reduced by reducing the difference in the time the respective thyristors of the converter are driven into conduction, at the output 39 of the decoder 1 there is produced a signal for a return to the first stage of control. This signal is applied to the input 38 of the sign flip-flop 26, whereby the flip-flop is brought to another steady state. As this takes place, there is no longer a signal at the output 42.

The converter's output voltage is reduced during the first stage of control by increasing the interval between the time the thyristor 18 is driven into conduction and the time the thyristors 18 and 22 are simultaneously driven into conduction, as well as the interval between the time the thyristor 20 is driven into conduction and the time the thyristors 20 and 23 are simultaneously driven into conduction.

During the first stage of control, the signal from the output 32 of the control unit 8 is applied to the input of the AND gate 30, to whose other input there is applied a signal from the output 43 of the sign flip-flop 26. The signal is then applied to the add input 33 of the reversible counter 4 which performs addition so as to increase the interval between the time of arrival of pulses at the control electrode of the thyristor 18 and the time of arrival of pulses at the control electrode of the thyristor 22, as well as to increase the time difference between the pulses at the control electrode of the thyristor 20 and the pulses at the control electrode of the thyristor 23. The order in which pulses are applied to the electrodes of the thyristors 18, 20, 22 and 23 is like the one described above for the case of position selection, only in this alternate case the sequence of events is reversed.

The device of the present invention ensures the aforesaid sequence of connecting the outputs 24 and 25 of the decoder 1 and the outputs 19 and 21 of the clock pulse counter 2 to the control electrodes of the thyristors 18, 20, 22 and 23 of the converter and provides for digital control of the thyristor-pulse converter with a common commutation unit and with precharging of the switching capacitor 44 without the main thyristors.

When used to control the speed of rotation of d.c. machines, the device of this invention makes it possible to improve the effectiveness of d.c. machines employed in industry and railroad transport.

What is claimed is:

1. A digital control device for controlling a d.c. thyristor-pulse converter, comprising:

a decoder having first and second information inputs, a first time-shiftable control pulse output, a second time-shiftable control pulse output, a first switching output of control pulses for switching control stages, and a second switching output of control pulses for switching control stages;

a clock pulse counter having an input, a first time-fixed control pulse output, a second time-fixed control pulse output, and information outputs connected to said first information inputs of said decoder;

a master oscillator having an input, and an output connected to said input of said clock pulse counter;

a reversible counter having a reset input connected to said first switching output of said decoder, an initial state setting input, a subtract input, an add input, and information outputs connected to said second information inputs of said decoder;

a control unit having a position selection output, a position return output, and an initial position setting output connected to said input of said master oscillator and to said initial position setting input of said reversible counter;

a control pulse switching unit comprising first and second flip-flops and first, second, third, fourth, fifth and sixth AND gates; wherein said first flip-flop has a counting input and an output;

said second flip-flop has a counting input and an output;

said first AND gate of said control pulse switching units has a first input connected to said second time-shiftable control pulse output of said decoder, a second input, and an output connected to a control electrode of a first thyristor of the converter and to said counting input of said first flip-flop, said control electrode also being connected to said first output of said clock pulse counter;

said second AND gate of said control pulse switching unit has a first input connected to said first time-shiftable control pulse output of said decoder, a second input, and an output connected to a control electrode of a second thyristor of the converter and to said counting input of said second flip-flop, said control electrode also being connected to said second output of said clock pulse counter;

said third AND gate of said control pulse switching unit has a first input connected to said output of said second flip-flop, a second input, and an output connected to a control electrode of a third thyristor of the converter;

said fourth AND gate of said control pulse switching unit has a first input connected to said output of said first flip-flop, a second input, and an output connected to a control electrode of a fourth thyristor of the converter;

said fifth AND gate of said control pulse switching unit has a first input connected to said first time-shiftable control pulse output of said decoder, a second input, and an output connected to said control electrodes of said first and third thyristors of the converter; and said sixth AND gate of said control pulse switching unit has a first input connected to said second time-shiftable control pulse output of said decoder, a second input, and an output connected to said control electrodes of said second and fourth thyristors of the converter; and a matching unit for matching the states of said control pulse switching unit and of said reversible counter with the state of said control unit comprising a sign flip-flop and first, second, third and fourth AND gates; wherein said sign flip-flop of said matching units has a first input connected to said first switching output of said decoder, a second input connected to said second switching output of said decoder and to said initial state setting output of said control unit, a first output connected to said second inputs of said first, second, third and fourth AND gates of said control pulse switching unit, and a second output connected to said second inputs of said fifth and sixth AND gates of said control pulse switching unit;

said first AND gate of said matching unit has a first input connected to said position selection output of said control unit, a second input connected to said second output of said sign flip-flop, and an output connected to said subtract input of said reversible counter;

said second AND gate of said matching unit has a first input connected to said position selection output of said control unit, a second input connected to said first output of said sign flip-flop, and an output connected to said add input of said reversible counter;

said third AND gate of said matching unit has a first input connected to said position return output of said control unit, a second input connected to said first output of said sign flip-flop, and an output connected to said subtract input of said reversible counter; and said fourth AND gate of said matching unit has a first input connected to said position return output of said control unit, a second input connected to said second ouput of said sign flip-flop, and an output connected to said add input of said reversible counter.

* * * * *